United States Patent
Ohta et al.

(10) Patent No.: US 8,165,432 B2
(45) Date of Patent: Apr. 24, 2012

(54) INTERNAL-REFLECTION OPTICAL PATH CHANGING MEMBER

(75) Inventors: Tatsuya Ohta, Sakura (JP); Kunihiko Fujiwara, Sakura (JP); Akito Nishimura, Sakura (JP); Kenji Sasaki, Sakura (JP); Yukio Hayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 345 days.

(21) Appl. No.: 12/416,552

(22) Filed: Apr. 1, 2009

(65) Prior Publication Data
US 2009/0252455 A1 Oct. 8, 2009

(51) Int. Cl.
*G02B 6/26* (2006.01)
*G02B 6/36* (2006.01)

(52) U.S. Cl. .......................... 385/15; 385/88

(58) Field of Classification Search .............. 385/15, 385/16, 31, 39, 88, 147, 901
See application file for complete search history.

(56) References Cited

U.S. PATENT DOCUMENTS

| | | | | |
|---|---|---|---|---|
| 4,344,668 A * | 8/1982 | Gunther et al. | ............... | 385/120 |
| 5,555,331 A * | 9/1996 | Billet et al. | ............... | 385/49 |
| 5,659,643 A * | 8/1997 | Appeldorn et al. | ............... | 385/31 |
| 6,257,771 B1 * | 7/2001 | Okayasu | ............... | 385/89 |
| 6,813,418 B1 * | 11/2004 | Kragl | ............... | 385/49 |
| 6,874,950 B2 * | 4/2005 | Colgan et al. | ............... | 385/88 |
| 6,952,508 B2 * | 10/2005 | Simons et al. | ............... | 385/31 |
| 2001/0053260 A1 * | 12/2001 | Takizawa et al. | ............... | 385/14 |
| 2002/0076152 A1 * | 6/2002 | Hughes et al. | ............... | 385/35 |
| 2003/0044119 A1 * | 3/2003 | Sasaki et al. | ............... | 385/49 |

FOREIGN PATENT DOCUMENTS

| | | |
|---|---|---|
| JP | 2001-051162 A | 2/2001 |
| JP | 2001-174671 A | 6/2001 |
| JP | 2005-031556 A | 2/2005 |
| JP | 2006-023777 A | 1/2006 |
| JP | 2007-121973 A | 5/2007 |

* cited by examiner

*Primary Examiner* — Akm Ullah
(74) *Attorney, Agent, or Firm* — Sughrue Mion, PLLC

(57) ABSTRACT

An optical path changing member is assembled at ends of optical fibers and placed to face a substrate including an optical input/output terminal having optical axes inclined with respect to optical axes of the ends. The optical path changing member is made of a transparent material and includes a member body having a reflection surface for optically connecting the ends to the optical input/output terminal. The member body has optical fiber insertion holes and an end placement portion to which the insertion holes are open and in which the end faces of the optical fibers are placed. The reflection surface is formed so that light entering from the end faces of the optical fibers into the member body will be internally reflected toward the optical input/output terminal in the member body. The end placement portion is filled with an adhesive by which the ends are fixed to the member body.

8 Claims, 6 Drawing Sheets

INTERNAL-REFLECTION OPTICAL PATH CHANGING MEMBER

BACKGROUND OF THE INVENTION

1. Field of the Invention

The present invention relates to an optical path changing member to be assembled at ends of optical fibers, and particularly to an optical path changing member placed on a substrate provided with an optical input/output terminal so that the optical fibers are optically connected to the optical input/output terminal.

2. Description of the Related Art

In recent years, the following mechanism for optically connecting optical fibers to optical elements, such as light emitting elements (e.g. semiconductor lasers) and light receiving elements (e.g. photodiodes), has been widely used: the optical fibers are placed along a substrate having the optical elements mounted thereon; and an optical connector assembled at ends of the optical fibers is fixed to the substrate (see International Patent Publication WO/2004/097480).

The above-described optical connector has a structure for changing optical paths in order to optically connect the optical fibers to the optical elements.

Japanese Patent Application Laid-Open Publication No. 2005-31556 discloses an optical coupling element having a structure for changing the directions of optical paths. The optical coupling element is made of a transparent material and has an inclined surface. Optical fibers are placed at an end face of the optical coupling element. Light which has entered the optical coupling element from the optical fibers is reflected by an inner surface of the inclined surface, whereby the directions of optical paths are changed.

Japanese Patent Application Laid-Open Publication No. 2007-121973 discloses an integrally-molded block-shaped optical connector made of a transparent material. This optical connector has closed-bottom optical fiber holes in which ends of optical fibers are inserted and fixed. At the front of the closed-bottom optical fiber holes, an optical axis change reflection surface is formed which directs the optical axes of the optical fibers toward entry/exit terminals.

The optical coupling element described in Japanese Patent Application Publication Laid-Open No. 2005-31556 has integrally-molded lenses for optical axis matching at an end of the optical coupling element. The optical fibers are placed at positions facing these lenses. Accordingly, high-accuracy molding and high-accuracy positioning are needed to reduce connection loss.

However, since end faces of the optical fibers are placed at the end face of the optical coupling element, it is difficult to position the optical fibers and form the lenses with high accuracy. Thus, product yield tends to decrease.

SUMMARY OF THE INVENTION

The present invention has been made in view of the aforementioned circumstances, and an object of the present invention is to provide an internal-reflection optical path changing member in which optical fibers can be easily positioned in a member body with high accuracy, and which therefore has stable optical interconnection characteristics and high product yield.

An aspect of the present invention is an optical path changing member to be assembled at ends of optical fibers and placed to face a substrate including an optical input/output terminal having optical axes inclined with respect to optical axes of the ends.

The optical path changing member includes a member body made of a transparent material which has a reflection surface for optical interconnection between the optical fibers and the optical input/output terminal. The member body has optical fiber insertion holes into which the optical fibers are inserted. One ends of the respective optical fiber insertion holes are open to one side surface of the member body, and the other ends thereof are open to an end placement portion (recess).

In the end placement portion, the ends of the optical fibers are placed.

The inside of the end placement portion is filled with an adhesive. Thus, the optical fibers are fixed in the member body.

The reflection surface is disposed further forward than the end placement portion.

The reflection surface has a function to internally reflect light entering from one of the optical input/output terminal and any of the ends of the optical fibers into the member body toward the other in the member body.

The reflection surface may be one of the outer side surfaces of the member body or one of the surfaces of the recess formed in the member body.

The reflection surface may be formed of multiple flat surfaces (inclined surfaces, each formed by a combination of straight lines) which have different inclination angles with respect to the optical axes of the optical fibers and that of the optical input/output terminal.

The inclination angles of these inclination surfaces may be set so that light reflected therefrom will be collected on the end faces of the optical fibers and the optical input/output terminal.

It can be said that the inclined surfaces collectively form a substantially concave surface as seen in an incident direction of light propagating through the member body.

Alternatively, the reflection surface may be a continuous concave surface as seen in an incident direction of light propagating through the member body.

In this case, the curvature and curved shape of the reflection surface can be set so that converging points of light reflected from the reflection surface will be at the end faces of the optical fibers and the optical input/output terminal.

A substrate-side surface of the member body may have convex lenses protruding from the member body and a protrusion (frame) protectively surrounding the lenses.

The convex lenses can be formed to correspond one-to-one to optical paths of light entry/exit portions of the member body.

In this case, the protrusion preferably protrudes further than the tops of the lenses to protect the surfaces of the lenses.

The insertion of the optical fibers into the optical fiber insertion holes causes the ends of the optical fibers to protrude from the optical fiber insertion holes toward the internal space of the end placement portion, and then come into contact with an inner wall opposite to the insertion side of the end placement portion. Thus, the optical fibers are positioned in the member body.

Meanwhile, the arrangement pitch of the optical fibers in the arrangement direction is determined by the arrangement pitch of the optical fiber insertion holes.

As described previously, it is not easy to mold closed-bottom optical fiber insertion holes with one ends closed in the body of an optical path changing member with high accuracy. Thus, molding failures tends to occur.

Molding failures of optical fiber insertion holes causes an increase in optical loss between the optical fibers and an optical path changing member.

On the other hand, it is easy to mold optical fiber insertion holes with both ends open with high accuracy because what is needed is to ensure the accuracy of the inner diameters thereof.

Also, smoothing a surface of a mold of upward releasing type for molding the inner wall makes it easy to mold the inner wall of with high accuracy, the optical fibers coming into contact with the end placement portion for positioning thereof.

The inner wall which is an accurately-smoothed surface can reduce the loss of light propagating between the optical fibers and the inner wall.

Further, when optical fibers are bonded to the insides of optical fiber insertion holes with an adhesive, it is also difficult to bond the optical fibers to closed-bottom optical fiber insertion holes. This increases the defective occurrence rate.

Since it is easy to bond optical fibers to optical fiber insertion holes with both ends open, with an adhesive, the product yield of the present invention is less likely to decrease.

Further, the ends of the optical fibers can be fixed in the end placement portion by embedding the ends of the optical fibers in the adhesive. Thus, stable optical interconnection can be established.

Moreover, in the end placement portion, air bubbles are easily released from the adhesive. This can prevent residual air bubbles from adversely affecting the optical interconnection.

DETAILED DESCRIPTION OF THE PREFERRED EMBODIMENTS

Figure 1:
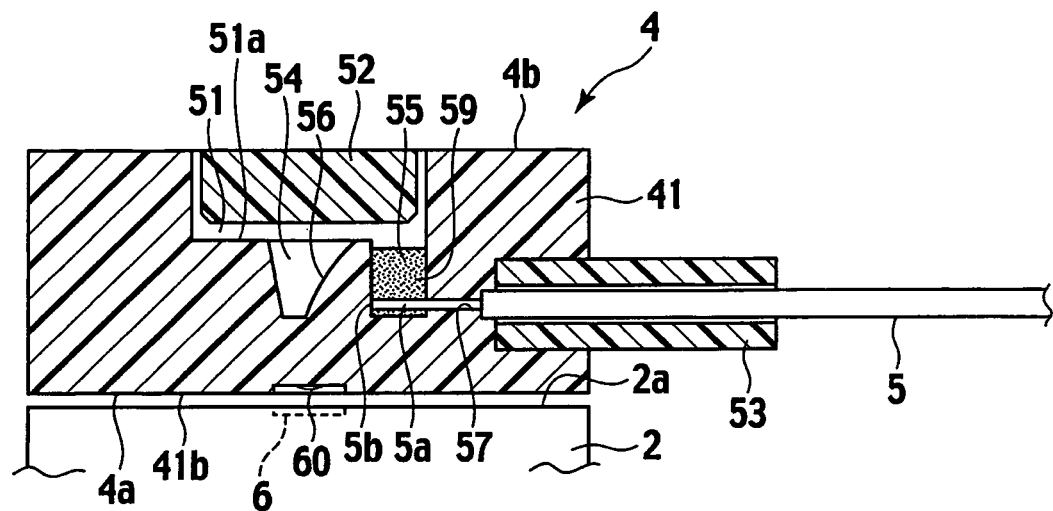
FIG. 1 is a cross-sectional view showing an optical path changing member according to an embodiment of the present invention.
Figure 2:
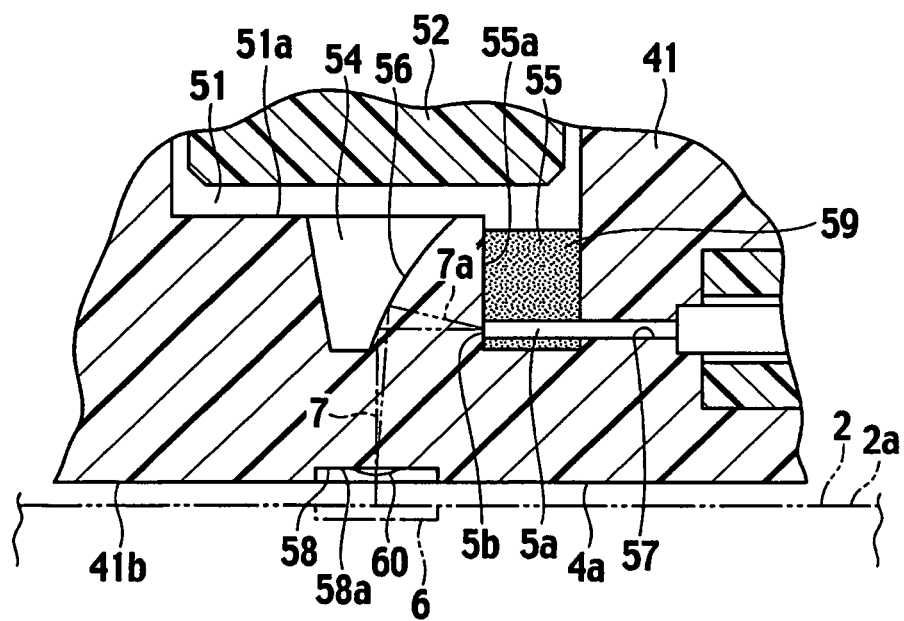
FIG. 2 is an enlarged cross-sectional view showing a main part of the optical path changing member in FIG. 1.
Figure 3A:
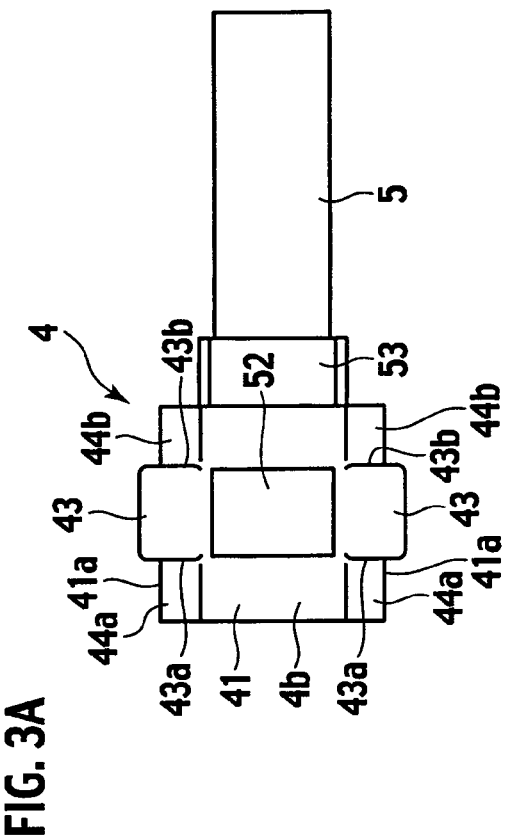
FIGS. 3A to 3C are a plan view, a front view, and a side view showing the optical path changing member in FIG. 1, respectively.
Figure 3C:
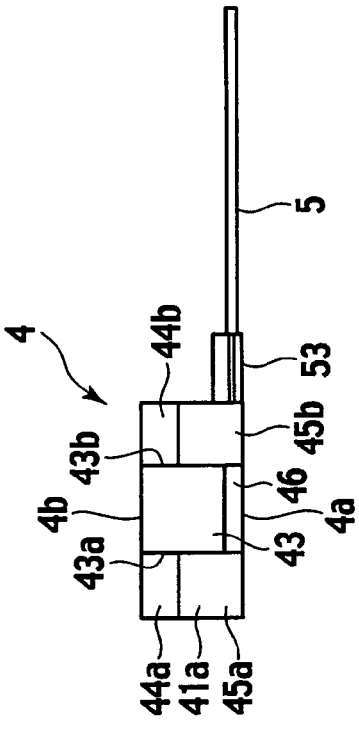
Figure 3B:
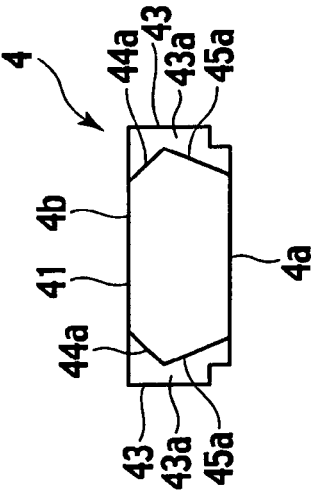
Figure 4:
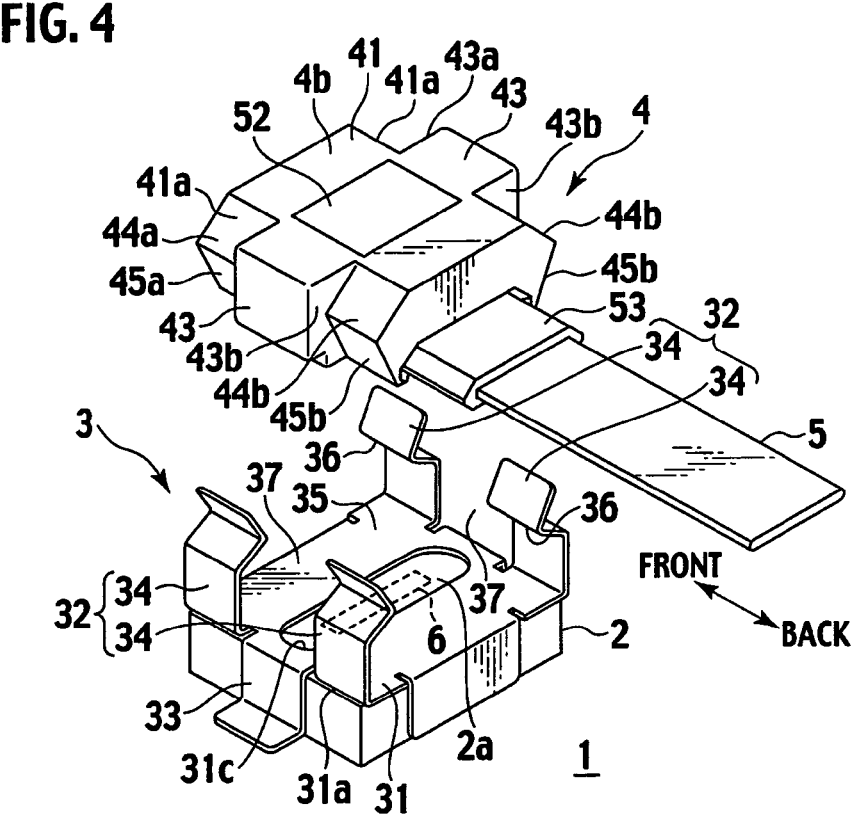
FIG. 4 is a perspective view showing the optical path changing member in FIG. 1 and a member holder.
Figure 5:
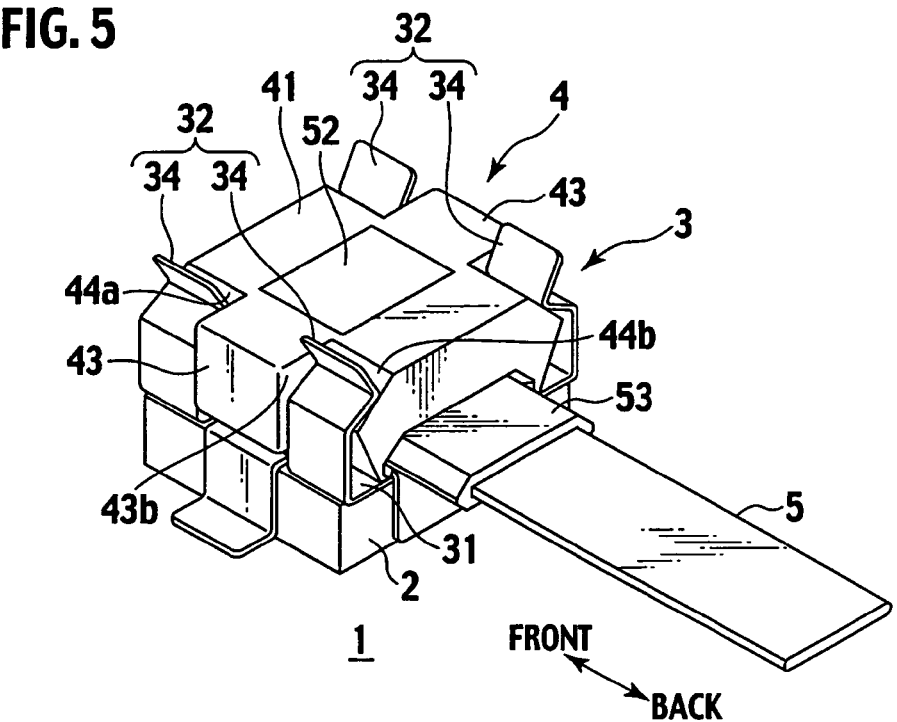
FIG. 5 is a perspective view showing the optical path changing member in FIG. 1 and the member holder.

FIG. 1 is a cross-sectional view showing an optical path changing member 4 according to an embodiment of the present invention. FIG. 2 is an enlarged cross-sectional view showing a main part of the optical path changing member 4. FIGS. 3A to 3C are a plan view, a front view, and a side view showing the optical path changing member 4, respectively. FIGS. 4 and 5 are perspective views showing the optical path changing member 4 and a member holder 3, respectively.

As shown in these drawings, the optical path changing member 4 is assembled at ends 5a of optical fibers 5. The optical path changing member 4 is fixed to a photoelectric conversion module 2 on a circuit board 1 with the member holder 3.

The photoelectric conversion module 2 is equipped with an optical input/output terminal (photoelectric conversion elements) 6 which converts voltage/current into light or converts light into voltage/current. That is, the photoelectric conversion module 2 has the function to drive light emitting elements (optical input/output terminal 6) on the basis of control signals sent from a driving circuit (not shown) on the circuit board 1 and/or the function to transmit electric signals according to light reception signals of light receiving elements (optical input/output terminal 6) to a processing circuit (not shown) on the circuit board 1.

The photoelectric conversion module 2 is formed in, for example, a cuboid shape. The upper surface of the photoelectric conversion module 2 serves as a mounting surface 2a on which the optical path changing member 4 is placed.

The optical input/output terminal 6 includes, for example, light emitting elements such as semiconductor lasers (e.g. laser diodes (LDs) and the like) or light receiving elements such as photodiodes (PDs).

As shown in FIG. 2, the optical axes of the optical input/output terminal 6 is perpendicular to the mounting surface 2a of the photoelectric conversion module 2, but may also be inclined with respect to the mounting surface 2a.

FIGS. 1 and 2 show a configuration in which the optical input/output terminal 6 is disposed in the mounting surface 2a. The mounting surface 2a extends along the circuit board 1 to which the photoelectric conversion module 2 is mounted.

Though not shown, a photoelectric conversion circuit, a control processor, an optical signal processing circuit, an optical element driving circuit, and other various circuits are configured on the circuit board 1, for example, to control the driving of electronic parts thereon.

The bottom surface of the optical path changing member 4 serves as an installation surface 4a which faces the mounting surface 2a of the photoelectric conversion module 2.

The optical path changing member 4 is assembled at the ends 5a of the optical fibers 5 and placed on the photoelectric conversion module 2.

The optical fibers 5 are included in, for example, an optical fiber ribbon. The ends 5a of the optical fibers 5 are exposed at an end of the optical fiber ribbon, i.e., bare optical fibers without a sheath.

In the illustrated example, the ends 5a are portions which are exposed from the optical fiber ribbon, inserted into the optical path changing member 4, and bonded thereto with an adhesive. The ends 5a are arranged along the installation surface 4a of the optical path changing member 4. There are multiple ends 5a arranged along the direction perpendicular to the drawing plane.

The optical fibers 5 are not limited to a structure in which multiple optical fibers are integrated into one bundle with a resin sheath as in an optical fiber ribbon, but may also be a group of resin-coated optical fibers.

In the description below, the direction (left in FIG. 1) to the ends 5a without a sheath of the optical fibers 5 and the opposite direction (right in FIG. 1) are sometimes referred to as a front direction and a back direction, respectively. The expression "front-to-back direction" in this specification means the direction of the optical axes of the ends 5a of the optical fibers 5. Further, the installation surface 4a side and the opposite surface side (upper surface 4b side) are sometimes referred to as bottom and top, respectively.

As shown in FIG. 1, the optical path changing member 4 includes a member body 41 made of a transparent material (optically transparent material), a cover 52 which closes a recess 51 formed in the middle of the upper surface of the member body 41, and a boot 53 made of resin.

It should be noted that the word "transparent" means that optical loss is small enough not to impair practical use in a communication wavelength range to be used, and is not limited to a visually transparent state. The word thus defined is consistently used in the present invention.

The material of the member body 41 is preferably, for example, polycarbonate, modified polyolefin, or epoxy resin. The refractive index of the material of the member body 41 is, for example, more than one.

As shown in FIGS. 1 and 2, a first recess (reflection surface formation portion) 54 and a second recess (end placement portion) 55 are formed in the bottom surface 51a of the recess 51.

As shown in FIGS. 3A to 3C, the recess 51 formed in the upper surface of the member body 41 is formed in a rectangular shape as seen from the top.

The recess 51 has long sides along the width direction thereof (perpendicular to the optical axes of the optical fibers in FIG. 3A).

The first recess 54 extends in the direction (direction perpendicular to the drawing plane in FIG. 1) approximately perpendicular to the front-to-back direction, and has a cross sectional in which the width thereof gradually decreases in a depth direction (toward the bottom in FIG. 1).

The back-side wall of the first recess 54 is a light reflection surface 56 which is inclined with respect to the optical axes (lateral direction in FIG. 1) of the optical fibers 5 and the optical axis (vertical direction in FIG. 1) of the optical input/output terminal 6.

In this embodiment, the reflection surface 56 is a curved surface (spherical or aspherical surface). The angle between a tangent of the reflection surface 56 and the direction of the optical axes of the optical fibers 5 increases toward the bottom of the recess 54.

That is, the reflection surface 56 can be formed to have a continuous concave surface as seen in the incident direction of light. In other words, the reflection surface 56 can be formed to have a continuous convex surface as seen from the inside of the first recess 54.

Optical paths between the ends 5a of the optical fibers 5 and the optical input/output terminal 6 are formed by optical interconnection via the reflection surface 56.

With the above-described configuration, for example, light emitted from the ends 5a which is directed upward with respect to the horizontal can also be reflected toward the optical input/output terminal 6 with high efficiency as shown by reference numeral 7a in FIG. 2.

The reflection surface 56 is an internal reflection surface in the member body 41 based on the difference in refractive indexes between the material constituting the member body 41 and air in the first recess 54.

For the reflection efficiency of the reflection surface 56, the higher is better. Also, the first recess 54 may contain other gas or resin which satisfies a proper refractive index difference between the material in the first recess 54 and that of the member body 41.

In this embodiment, the reflection surface 56 is located above the optical input/output terminal 6 when the optical path changing member 4 is fixed to the photoelectric conversion module 2. More specifically, the reflection surface 56 is located above a light emitting surface or a light receiving surface of the optical input/output terminal 6.

The reflection surface 56 directs light which has emitted from end faces 5b of the optical fibers 5 and then entered the member body 41, toward the optical input/output terminal 6 by reflecting the light in the member body 41. Alternatively, the reflection surface 56 directs light which has emitted from the optical input/output terminal 6 and then entered the member body 41, toward the end faces 5b of the optical fibers 5 by reflecting the light in the member body 41. Thus, the ends 5a and the optical input/output terminal 6 are optically connected to each other by optical paths 7 (see FIG. 2).

In each of the optical paths 7, a portion between the reflection surface 56 and the optical input/output terminal 6 approximately corresponds to the optical axis of the optical input/output terminal 6, and is approximately perpendicular to or inclined with respect to the optical axis of the end 5a.

In this embodiment, the optical axes of the ends 5a are parallel to the extending direction of the circuit board 1 and that of the photoelectric conversion module 2, i.e., to the extending direction of the bottom surface of the optical path changing member 4 and that of the installation surface 2a of the photoelectric conversion module 2. Further, in a region between the reflection surface 56 and the optical input/output terminal 6, the optical paths 7 are perpendicular to the optical axes of the ends 5a.

The reflection surface 56 preferably has such a curvature that the end faces 5b (particularly the cores) of the optical fibers 5 and the optical input/output terminal 6 are positioned at the converging points of reflected light. This maintains optical interconnection even if the direction of incident light deviates.

Although the reflection surface 56 of the above-described embodiment has a uniform cross section (across the direction approximately perpendicular to the drawing plane), it is most preferable to arrange multiple spherical or aspherical micro convex lenses for respective light spots on the reflection surface, i.e., for respective optical paths.

In this case, the reflection surface 56 can be a flat surface, rather than a curved surface, on which micro convex lenses are formed.

Forming a micro convex lens for each light spot (for each optical path) greatly increases an optical coupling factor.

The inclination angle, curvature, curved surface shape, and the like of the reflection surface 56 can be appropriately designed so that the ends 5a of the optical fibers 5 can be efficiently connected to the optical input/output terminal 6.

The second recess 55 is a groove formed behind the first recess 54. This groove extends in the direction (direction approximately perpendicular to the drawing plane) approximately perpendicular to the front-to-back direction.

In this embodiment, the second recess 55 has an approximately rectangular cross section. The inner surface of this rectangle is formed by front and back surfaces facing each other and a bottom surface.

The front surface 55a of the second recess 55 serves as an entry/exit surface into/from which light emitted from the optical fibers 5 (or the optical input/output terminal 6) enters (or exits). The entry/exit surface 55a is preferably formed in a plane approximately perpendicular to the front-to-back direction (direction of the optical axes of the optical fibers 5).

Inside the member body 41, optical fiber insertion holes 57 are formed in the front-to-back direction. One ends of the optical fiber insertion holes 57 are open to the back surface of the second recess 55.

The member body 41 has in a back surface thereof a boot insertion portion into which the boot 53 covering the optical fibers 5 is inserted.

The boot insertion portion is larger than the optical fiber insertion holes. Back ends of the optical fiber insertion holes 57 are continuous with the boot insertion portion.

In the member body 41, multiple optical fiber insertion holes 57 are formed in the direction perpendicular to the drawing plane in FIG. 1. The number of optical fibers 5 is the total number of optical fibers constituting the optical fiber ribbon.

The ends 5a of the optical fibers 5 are inserted in the optical fiber insertion holes 57 and disposed in such a manner that the end faces 5b contact the inner surface of the second recess 55.

The ends 5a of the optical fibers 5 are bare optical fibers, and the optical fiber insertion holes 57 have diameters large enough to receive the bare optical fibers.

For example, since the diameter of glass of a standard optical fiber is 125 μm, the diameter of the optical fiber insertion hole 57 may be approximately 126 μm to 129 μm.

However, the optical fiber 5 to be connected is not limited to a standard optical fiber. A combination of the optical fiber insertion hole 57 with an inner diameter of several micrometers larger than 80 μm and a thin optical fiber with a glass diameter of 80 μm may also be employed.

In this embodiment, the end faces 5b of the optical fibers 5 are formed perpendicular to the optical axes of the ends 5a to face the entry/exit surface 55a in the vicinity thereof or in contact therewith.

Most preferably, the ends 5a of the optical fibers 5 are fixed at such positions that the end faces 5b of the optical fibers 5 are in contact with the inner surface of the second recess 55.

After the positioning of the optical fibers 5, the second recess 55 is filled with an adhesive 59, and the ends 5a of the optical fibers 5 are bonded to the inside of the second recess 55 with this adhesive 59.

The adhesive 59 can bond the ends 5a to the inner surfaces of the optical fiber insertion holes 57.

The adhesive 59 is preferably optically transparent, particularly with a refractive index optically equal to that of the cores of the optical fibers 5.

In the case where the end faces 5b and the entry/exit surface 55a have gaps therebetween, the adhesive 59 filling these gaps functions as are fractive index matching agent. Thus, optical loss can be reduced.

The recess 51 is preferably closed with the cover 52 so as to be made dust-proof. This makes the reflection surface formation recess 54 and the second recess 55 substantially hermetically sealed.

Thus, the reflection surface formation recess 54 is not exposed to outside air. This prevents adhesion of dust or the like to the reflection surface 56 and therefore, prevents reduction of the reflection efficiency of the reflection surface 56.

The cover 52 may be an openable cover. Alternatively, in a clean environment with little dust, the cover 52 may be omitted to keep the recess 51 open.

In the lower surface 41b (installation surface 4a) of the member body 41, a lens formation recess 58 may be formed. In this case, lenses 60 can be formed on an upper surface (ceiling 58a) of the lens formation recess 58. The lenses 60 may be formed integrally with the member body 41 at positions facing the optical input/output terminal 6, or may also be formed separately from the member body 41 and then fixed to the member body 41.

The lenses 60 collect light reflected from the reflection surface 56 toward the optical input/output terminal 6, or collect light emitted from the optical input/output terminal 6 toward the reflection surface 56.

The protruding heights of the lenses 60 from the ceiling 58a are preferably smaller than the depth of the lens formation recess 58.

As shown in FIGS. 3A to 3C, the member body 41 is formed in a block-like shape. On both side portions 41a, 41a, protrusions 43, 43 protruding outward are formed. In this embodiment, the protrusions 43 protrude in the upward and downward directions of FIG. 3A, respectively.

As shown in FIGS. 3A to 3C, the protrusions 43 are formed in approximately cuboid shapes in about the middle of the member body 41 with respect to the front-to-back direction. The front and back faces 43a and 43b of the protrusions 43 are formed approximately perpendicular to the front-to-back direction.

In the side portions 41a of the member body 41, front-side pressed slopes 44a and back-side pressed slopes 44b are formed at the front and back of the protrusions 43.

The pressed slopes 44a and 44b are portions which are pressed down by elastic holding portions 32 of the member holder 3. The pressed slopes 44a, 44a are inclined toward the installation surface 4a in such a manner that the distance therebetween increases. Similarly, the pressed slopes 44b, 44b are also inclined toward the installation surface 4a in such a manner that the distance therebetween increases.

In this embodiment, the pressed slopes 44a and 44b are formed in upper portions of front and back portions of each of the side portions 41a. Under the pressed slopes 44a and 44b, guide slopes 45a and 45b are formed. The guide slopes 45a, 45a are inclined toward the installation surface 4a in such a manner that the distance therebetween decreases. Similarly, the guide slopes 45b, 45b also descend toward the installation surface 4a in such a manner that the distance therebetween decreases.

The guide slopes 45a and 45b can be formed so that the pair of elastic holding portions 32, 32 can be pushed open outward when the optical path changing member 4 is placed in the member holder 3.

The member body 41 can be fabricated by general resin molding such as injection molding.

As shown in FIG. 4, the member holder 3 positions and holds the optical path changing member 4 on the photoelectric conversion module 2, and presses the optical path changing member 4 against the photoelectric conversion module 2 so that the position of the optical path changing member 4 will not be changed.

The member holder 3 includes a planar base 31, the pair of elastic holding portions 32, 32, and holding plates 33. Specifically, the base 31 is rectangle as seen from the top, and the optical path changing member 4 is mounted to this base 31. The elastic holding portions 32, 32 rise from two side edges 31a, 31a of the base 31. The holding plates 33 extend downward from edges of the base 31.

In the base 31, an opening 31c is formed. The opening 31c is formed to include a position corresponding to the optical input/output terminal 6 of the photoelectric conversion module 2. That is, the opening 31c is formed so that the optical input/output terminal 6 can be seen from the optical path changing member 4.

The elastic holding portions 32, 32 detachably hold the optical path changing member 4 by pressing it from two opposite sides thereof. The pair of elastic holding portions 32 forms a member holding space 35 in which the optical path changing member 4 is held.

Each elastic holding portion 32 includes two elastic pieces 34, 34. That is, the elastic holding portions 32, 32 are formed of four elastic pieces 34 in total.

The elastic pieces 34 hold the optical path changing member 4 so as to press the optical path changing member 4 against the photoelectric conversion module 2. The elastic pieces 34 are arms each formed in the shape of a plate with a constant width, and are integrated with the base 31 to extend upward from the side edges 31a of the base 31. Further, the elastic pieces 34 elastically deform in directions in which the elastic pieces 34 move close to and away from the member holding space 35.

Two elastic pieces 34, 34 constituting one elastic holding portion 32 are formed to be spaced from each other in the front-to-back direction. The gap between these elastic pieces 34, 34 is approximately equal to or slightly larger than the length of the protrusion 43 in the front-to-back direction so as to serve as a fitting portion 37 into which the protrusion 43 of the optical path changing member 4 is fitted. Further, the elastic pieces 34 have member contact portions 36 at the tips thereof. Each of the member contact portions 36 is formed by bending the elastic pieces 34 toward the member holding space 35 to have a V-shaped cross section. As described later, the member contact portions 36 come into contact with the pressed slopes 44a and 44b.

The front-side elastic pieces 34 with respect to the front-to-back direction are preferably located in front of that of the optical input/output terminal 6. The back-side elastic pieces 34 with respect to the front-to-back direction are preferably located behind that of the optical input/output terminal 6.

Thus, the entire optical path changing member 4 can be pressed in such a manner that the position of optical interconnection is surrounded, and a uniform pressing force is applied to the optical path changing member 4. Accordingly, the accuracy of optical interconnection between the optical fibers 5 and the optical input/output terminal 6 can be improved.

The member holder 3 can be made of metal, synthetic resin, or the like. For example, the member holder 3 can be formed by folding and shaping a metal plate.

Next, the operation of placing the optical path changing member 4 in the member holder 3 will be described.

As shown in FIG. 4, moving the optical path changing member 4 toward the member holder 3 with the installation surface 4a facing the photoelectric conversion module 2 brings the guide slopes 45a and 45b into contact with the elastic pieces 34, respectively.

Coming into contact with the four elastic pieces 34, the optical path changing member 4 is placed in the member holder 3 while being maintained in a horizontal position.

The application of a downward force to the optical path changing member 4 pushes the elastic pieces 34 open outward in accordance with the guide slopes 45a and 45b.

After the boundaries between the pressed slopes 44a and 44b and the guide slopes 45a and 45b pass the member contact portions 36, the elasticity of the elastic pieces 34 brings the member contact portions 36 into contact with the pressed slopes 44a and 44b.

As shown in FIG. 5, in a state in which the installation surface 4a has reached the vicinity of the base 31, the optical path changing member 4 is placed in the member holding space 35 with the pressed slopes 44a and 44b on both sides pressed by the member contact portions 36 of the elastic pieces 34.

Since the member contact portions 36 are in contact with the pressed slopes 44a and 44b in the front-to-back direction, the optical path changing member 4 is held with higher stability than in the case where elastic pieces are in point contact with an optical path changing member.

The protrusions 43 of the optical path changing member 4 are fitted into the fitting portions 37, which are the gaps between the elastic pieces 34, 34. The contact between side edges of the elastic pieces 34, 34 and the front and back faces 43a and 43b of the protrusions 43 prevents the optical path changing member 4 from being displaced with respect to the front-to-back direction. Thus, the optical path changing member 4 is accurately positioned.

Moreover, the optical path changing member 4 is pressed by the elastic pieces 34 at the front and back portions of each the side portions 41a thereof. Thus, the optical path changing member 4 is stably held on the photoelectric conversion module 2.

In a state in which the optical path changing member 4 is held by the member holder 3, the ends 5a are optically connected to the optical input/output terminal 6.

Next, the assembly of the optical path changing member 4 will be described.

As shown in FIGS. 1 and 2, the ends 5a of the optical fibers 5 are inserted into the optical fiber insertion holes 57 from the back with the cover 52 detached from the member body 41, whereby the ends 5a protrude in the second recess 55.

Next, the optical fibers 5 are further pushed in, and then the end faces 5b of the tips thereof come into contact with the entry/exit surface 55a.

When the end faces 5b of the optical fibers 5 come into contact with the entry/exit surface 55a, the optical fibers 5 are accurately positioned at the positions. The lengths of the inserted portions of the optical fibers 5 are determined by the position of the entry/exit surface 55a of the second recess 55 with which the ends 5a come into contact.

The arrangement pitch of the optical fiber insertion holes 57 is the arrangement pitch (the direction perpendicular to the drawing plane in FIG. 1) of the ends 5a.

After the second recess 55 is filled with the adhesive 59 in an unhardened state, the recess 51 is closed with the cover 52, and the adhesive 59 is hardened. Thus, the optical path changing member 4 shown in FIGS. 1 to 3C is obtained.

An optical path changing member by which light passes through a member body made of a transparent material is disclosed in Japanese Patent Application Laid-Open Publication No. 2007-121973. According to this document, optical fibers are bonded to closed (i.e., closed-bottom) insertion holes formed in the member body with an adhesive, and light enters the member body from the optical fibers in these insertion holes.

Since the positioning accuracy of the optical fibers (e.g. bare optical fibers) depends on the accuracy of the insertion holes, the insertion holes with diameters in accordance with the optical fibers need to be formed to have sufficient depths with high accuracy. However, it is not easy to form insertion holes with small diameters and large depths with high accuracy. Thus, product yield tends to decrease due to molding failures.

In contrast, in the optical path changing member 4 of the present invention, the ends 5a are placed in the second recess 55 through the optical fiber insertion holes 57.

The optical fiber insertion holes 57 which are open-ended at both ends are easy to be molded with high accuracy in terms of the outer diameters thereof.

Moreover, the second recess 55 to which the ends 5a are fixed can be easily molded with a mold of upward releasing type.

Further, it is easy to machine a mold surface for molding the front surface 55a of the second recess 55 into a highly-accurately smoothed surface. Thus, it is easy to mold the front surface 55a with high accuracy, which is a reference surface for positioning the optical fibers 5.

Furthermore, when optical fibers are bonded to the inside of optical fiber insertion holes with an adhesive, it is difficult to bond the optical fibers to closed-bottom optical fiber insertion holes. This results in a high defection rate. In contrast, it is easy to bond optical fibers to the optical fiber insertion holes 57, which are open-ended at both ends. Accordingly, the product yield of the optical path changing member 4 is less likely to decrease.

Moreover, since the ends 5a of the optical fibers 5 can be bonded to the second recess 55 with the adhesive 59, stable optical interconnection can be established.

Also, in the second recess 55, air bubbles are easily released from the adhesive in an unhardened state. This can prevent residual air bubbles from adversely affecting optical interconnection.

Figure 6:
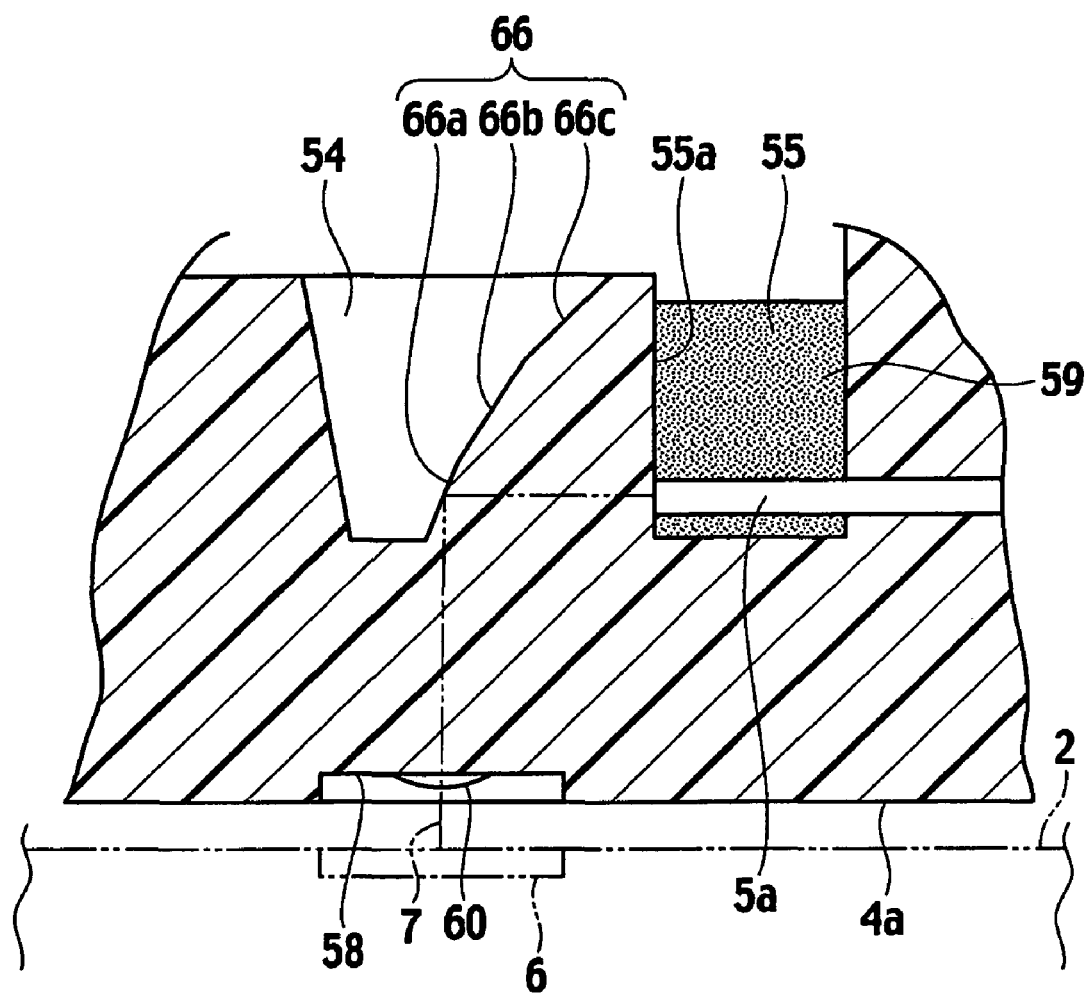
FIG. 6 is an enlarged cross-sectional view showing a critical portion of an optical path changing member according to an embodiment of the present invention.

FIG. 6 shows another embodiment of a reflection surface according to the present invention. As shown in this drawing, a reflection surface 66 includes substantially planar slopes 66a to 66c which have different inclination angles with respect to the optical axis. The slopes 66a to 66c collectively form a substantially concave surface as seen in the incident direction of light.

The inclination angles of the slopes 66a to 66c are preferably set so that the converging points of reflected light are located at the end faces 5b of the optical fibers 5 and the optical input/output terminal 6. That is, for each of the slopes 66a to 66c, the inclination angle is set so that light from one of the optical input/output terminal 6 and any of the end faces 5b is reflected toward the other. This maintains optical interconnection even if the direction of incident light deviates.

Figure 7:
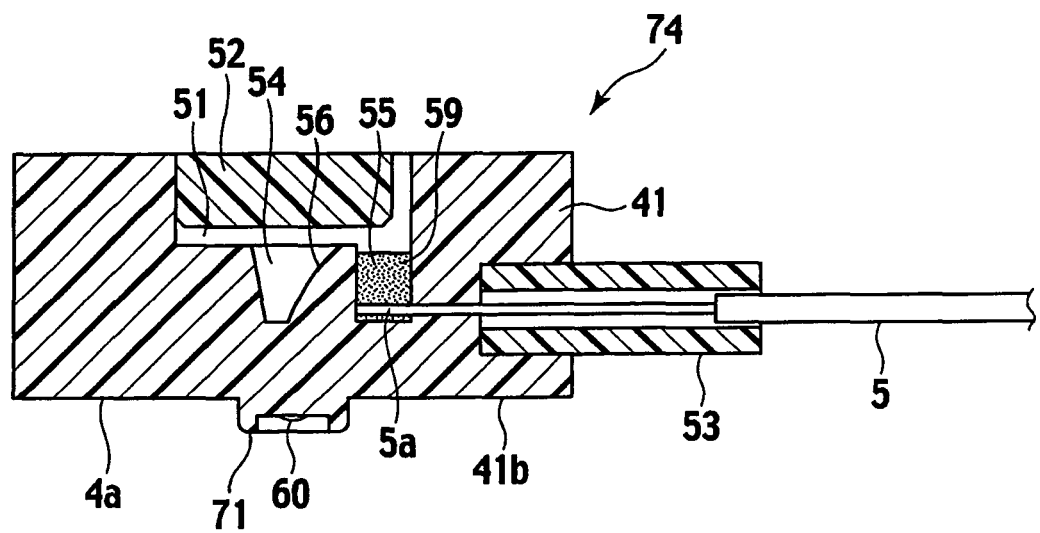
FIG. 7 is a cross-sectional view showing an optical path changing member according to an embodiment of the present invention.
Figure 8:
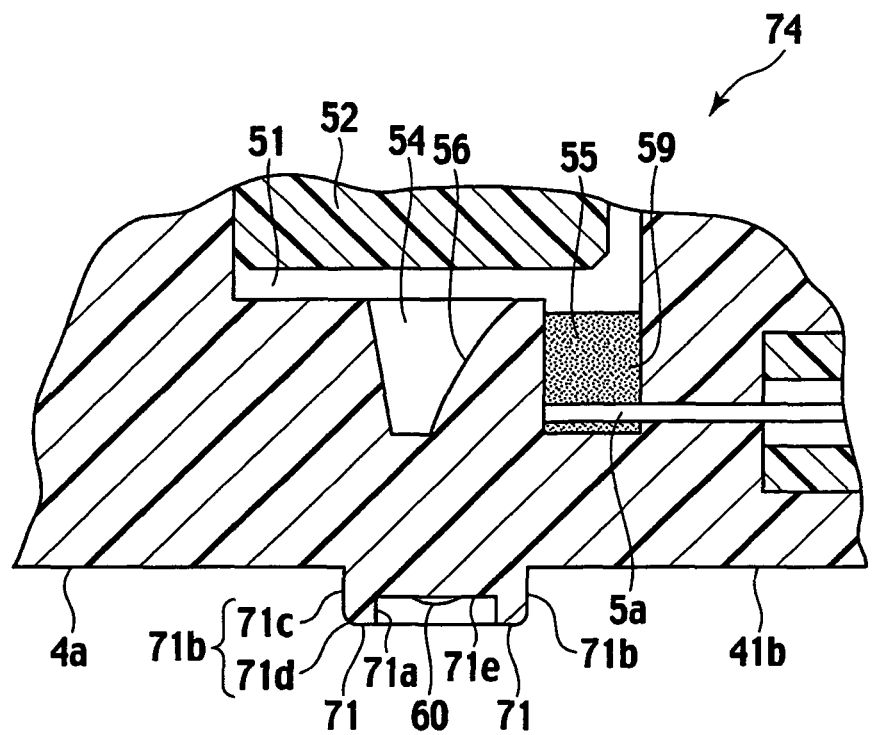
FIG. 8 is an enlarged cross-sectional view showing a critical portion of the optical path changing member in FIG. 7.
Figure 9:
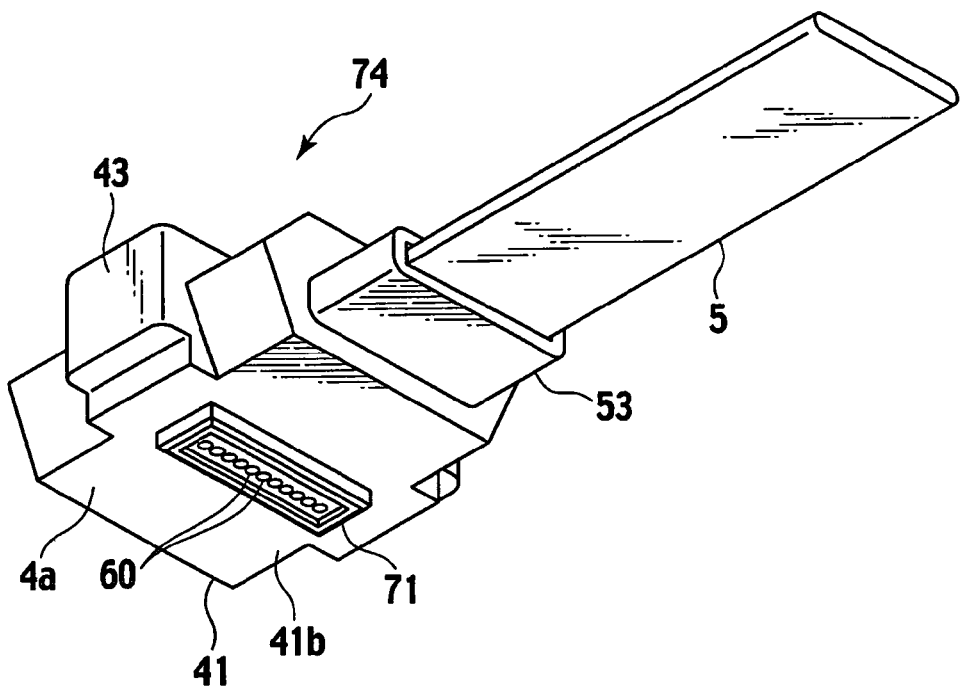
FIG. 9 is a perspective view showing the optical path changing member in FIG. 7.

FIGS. 7 to 9 show another embodiment of an optical path changing member according to the present invention. FIG. 7 is a cross-sectional view showing an optical path changing member 74 according to this embodiment. FIG. 8 is an enlarged cross-sectional view showing a critical portion of the optical path changing member 74. FIG. 9 is a perspective view showing the optical path changing member 74.

The optical path changing member 74 differs from the optical path changing member 4 shown in FIG. 1 in that a looped protrusion 71 surrounding the lenses 60 is formed in the lower surface 41b (installation surface 4a, circuit-board-side surface) of the member body 41.

The lenses 60 are formed to be arranged in the direction perpendicular to the drawing plane of FIGS. 7 and 8 (see FIG. 9). The lenses 60 are formed at positions facing the optical input/output terminal 6. The number of lenses 60 is equal to that of optical fibers 5 included in the optical fiber ribbon.

As shown in FIG. 9, the looped protrusion 71 is formed to protrude downward from the lower surface 41b in the shape of a rectangular frame as seen from the top. The cross-sectional shape of the looped protrusion 71 is not particularly limited, but the inner surface 71a of the looped protrusion 71 is formed perpendicular to the lower surface 41b as shown in FIG. 8. The outer surface 71b includes a base 71c perpendicular to the lower surface 41b and an end portion 71d which is curved in such a manner that the outer diameter of the looped protrusion 71 gradually decreases in the protruding direction.

On a ceiling 71e existing inside the looped protrusion 71, the lenses 60 are formed. As shown in FIG. 8, the position of the ceiling 71e is lower than that of the lower surface 41b of the member body 41. The lenses 60 are formed to protrude downward from the ceiling 71e.

The looped protrusion 71 is formed to protrude further than the lenses 60. That is, the protruding height (in the downward direction in FIGS. 7 and 8, protruding length from the ceiling 71e) of the looped protrusion 71 is larger than the protruding heights of the lenses 60 from the ceiling 71e.

The shape of the looped protrusion 71 as seen from the top is not limited to that shown in FIGS. 7 to 9, but may be a circle, an ellipse, a polygon (such as triangle or rectangle), or the like. The cross-sectional shape of the looped protrusion 71 is also not limited to that shown in FIGS. 7 to 9, but may be a semicircle, a polygon, or the like.

Further, in the present invention, a "protrusion surrounding lenses" is not limited to a looped shape, but may be a group of discontinuous protrusions. For example, two or more protrusions may be arranged to surround the lenses.

In the optical path changing member 74, the protruding height of the looped protrusion 71 is larger than those of the lenses 60. Accordingly, when the optical path changing member 4 is placed on the photoelectric conversion module 2, the lenses 60 can be prevented from being damaged due to a collision or the like with the photoelectric conversion module 2 or the like.

Figure 10:
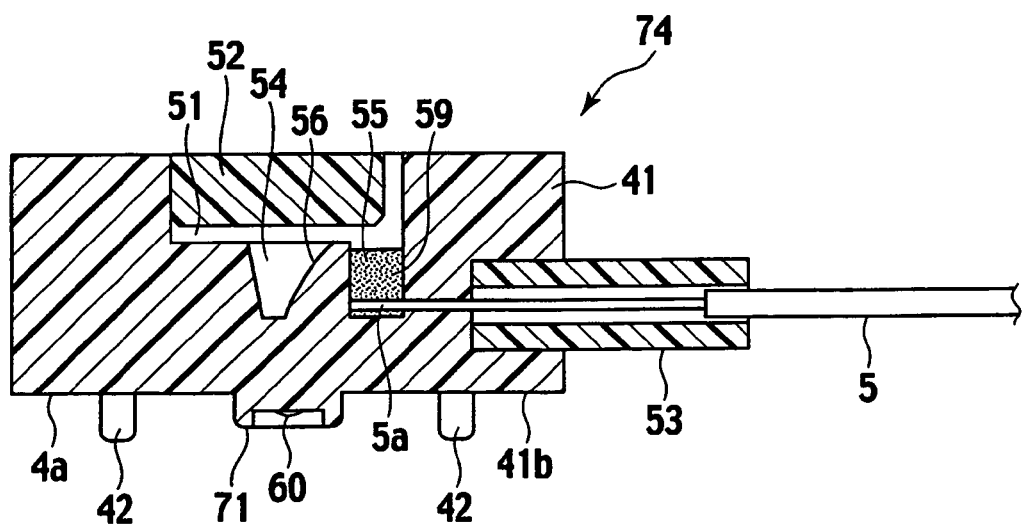
FIG. 10 is a cross-sectional view showing an optical path changing member according to an embodiment of the present invention.

Moreover, in the above-described member body 41 (see FIGS. 1 and 7), two fitting pins 42 protruding from the installation surface 4a may be provided. FIG. 10 shows an embodiment in which the two fitting pins 42 are disposed in the member body 41 shown in FIG. 7.

In the mounting surface 2a of the optical module 2, fitting holes (not shown) are formed at positions corresponding to those of the fitting pins 42.

The fitting pins 42 are disposed with light entry/exit portions (regions through which entering/exiting light passes; in this embodiment, portions in which the lenses 60 are formed) on the installation surface 4a interposed therebetween. The positions of the fitting pins 42 are preferably symmetric about the array of the lenses 60.

The fitting pins 42 are preferably molded integrally with the member body 41, rather than attached to the member body 41 after molding the member body 41.

The fitting pins 42 are round rods of circular cross section similar to fitting pins for a general mechanically transferable splicing connector (MT connector).

The two fitting pins 42 preferably have equal shapes but may have different shapes.

"The positions of the fitting pins 42 are symmetric about the array of the lenses 60" means "the positions of the fitting pins 42 are symmetric about the line segment connecting the light entry/exit portions of the installation surface 4a." The line segment preferably connects the centers of the light entry/exit portions.

Most preferably, the positions of the fitting pins 42 are point-symmetric about the center (also the center of the installation surface 42a) of the line segment.

This point-symmetric arrangement makes it possible to dispose the two fitting pins 42 on a line along the optical axes of the optical fibers 5, also on a line segment crossing the center of the installation surface 4a.

In the case where the fitting pins 42 and the fitting holes (not shown) are respectively disposed in the member body 41 and the optical module 2, the member body 41 may be formed in an approximately rectangular shape without the pressed slopes 44a and 44b and the guide slopes 45a and 45b shown in FIGS. 3A to 3C, and the member holder 3 may also be omitted.

In the present invention, a "substrate" indicates a substance to which optical elements as the optical input/output terminal are mounted, and corresponds to the circuit board 1 and the optical module 2 in FIG. 4.

In the above-described embodiments, one surface of a recess formed in a member body is used as a reflection surface. However, for example, one outer side surface of a member body may be used as a reflection surface.

The one outer side surface is a slope formed by cutting the outline (corner) of the member body at an angle with respect to the optical axes of the optical fibers 5.

In this case, adhesion of dust or the like to the reflection surface 56 is also preferably prevented by using appropriate means to prevent a decrease in reflection efficiency.

In the present invention, the insertion direction of the optical fibers 5 may be inclined with respect to the installation surface 4a. That is, the optical fiber insertion holes 57 may be inclined with respect to the installation surface 4a. In this case, the inclination and shape of the reflection surface, the shapes and curvatures of the lenses disposed on the reflection surface, and the like are appropriately modified in accordance with the inclination of the insertion direction.

The scope of the present invention includes not only the case where the entire member body is made of a transparent material, but also the case where at least an optical path is transparent and portions other than the optical path are made of a nontransparent material.

What is claimed is:

1. An optical path changing member to be assembled at ends of optical fibers and placed to face a substrate including an optical terminal having optical axes inclined with respect to optical axes of the ends, the optical path changing member comprising:
    a member body being made of a transparent material,
    the member body comprising
    optical fiber insertion holes into which the optical fibers are inserted;
    a reflection-surface-formation recess including a reflection surface in an inner surface thereof, the reflection surface optically connecting the optical fibers to the optical terminal, the reflection surface being inclined with respect to the optical axes of the optical fibers and the optical terminal for light entering into the member body from one of the optical terminal and any of end faces of the optical fibers to be internally reflected toward the other in the member body; and
    an end placement space to which the optical fiber insertion holes are open, having an inside wall facing openings of the optical fiber insertion holes and contacting with the ends of the optical fibers, and the end placement space being filled with an adhesive to fix the optical fibers therein; and
    a cover covering the reflection-surface-formation recess.

2. The optical path changing member according to claim 1, wherein the reflection surface is a continuous concave surface as seen in an incident direction of light propagating through the member body, and has a curvature and a curved shape so as to position converging points of light reflected from the reflection surface at the end faces of the optical fibers and the optical terminal.

3. The optical path changing member according to claim 1, wherein
    the reflection surface comprises a plurality of inclination surfaces having different inclination angles, the inclination surfaces collectively forming a substantially concave surface as seen in an incident direction of light propagating through the member body, and
    the inclination angles are set so that light reflected from the plurality of inclination surfaces is collected on the end faces of the optical fibers and the optical terminal.

4. The optical path changing member according to claim 1, wherein the reflection-surface-formation recess is substantially hermetically sealed by the cover.

5. The optical path changing member according to claim 1, further comprising:
    lenses and a protrusion formed on a substrate-side surface of the member body in a protruding manner, the lenses facing the optical terminal, the protrusion surrounding the lenses,
    wherein the protrusion protrudes further than the lenses.

6. The optical path changing member according to claim 1, further comprising:
    two fitting pins protruding from a substrate-side surface of the optical path changing member,
    wherein the fitting pins are disposed with light entry/exit portions in the substrate-side surface interposed therebetween, and the positions of the fitting pins are symmetric about a line segment connecting the light entry/exit portions.

7. The optical path changing member according to claim 6, wherein the two fitting pins are made of resin and molded integrally with the member body.

8. The optical path changing member according to claim 7, wherein the fitting pins are arranged at positions which are point-symmetric about a center of the line segment.

* * * * *